United States Patent [19]

Nohira et al.

[11] 4,191,144

[45] Mar. 4, 1980

[54] METHOD FOR CONTROLLING IGNITION TIMING IN AN INTERNAL COMBUSTION ENGINE

[75] Inventors: Hidetaka Nohira, Mishima; Kiyoshi Kobashi, Susono; Jiro Nakano, Toyota, all of Japan

[73] Assignee: Toyota Jidosha Kogyo Kabushiki Kaisha, Toyota, Japan

[21] Appl. No.: 893,391

[22] Filed: Apr. 4, 1978

[30] Foreign Application Priority Data

Sep. 5, 1977 [JP] Japan ................................ 52-105900

[51] Int. Cl.$^2$ ............................ F02P 5/04; F02B 5/02
[52] U.S. Cl. ............................ 123/117 R; 123/117 D; 123/119 A
[58] Field of Search ........... 123/117 R, 117 D, 119 A

[56] References Cited

U.S. PATENT DOCUMENTS

| 3,815,560 | 6/1974 | Wahl et al. ....................... 123/117 R |
| 4,106,448 | 8/1978 | Noguchi et al. .................. 123/117 R |
| 4,124,006 | 11/1978 | Rodenkilch ....................... 123/117 R |

Primary Examiner—Charles J. Myhre
Assistant Examiner—P. S. Lall
Attorney, Agent, or Firm—Stevens, Davis, Miller & Mosher

[57] ABSTRACT

Disclosed is a method for controlling the ignition timing in an internal combustion engine provided with an EGR device. In this method, the correct EGR ratio of the engine is obtained by means of a specific calculation using a measured absolute pressure value in an intake manifold of the engine where EGR gas is recirculated and using a calculated absolute pressure value in the intake manifold where no EGR gas is recirculated, according to the engine's operating conditions. The optimum ignition timing in the engine is controlled in accordance with the calculated EGR ratio.

6 Claims, 4 Drawing Figures

METHOD FOR CONTROLLING IGNITION TIMING IN AN INTERNAL COMBUSTION ENGINE

BACKGROUND OF THE INVENTION

This invention relates to a method for controlling ignition timing in an internal combustion engine. More particularly, the invention relates to a method for controlling ignition timing in an internal combustion engine provided with an exhaust gas recirculation device.

In order to reduce the contents of harmful components in the exhaust gas of an internal combustion engine and to obtain lower fuel consumption, it is necessary to effectively control the spark-advance of the engine in response to the engine's operating conditions. Since this optimum spark-advance angle changes depending mainly on the rotational speed of the engine and on the value of the absolute pressure in the intake manifold of the engine, namely, on the load of the engine, according to the conventional technique, a governor advance mechanism is used for setting the engine speed advance angle and a vacuum advance mechanism is used for setting the engine load advance angle. An apparatus is also used together with a digital computer for electronically controlling the engine speed advance angle and the engine load advance angle.

In an internal combustion engine provided with an exhaust gas recirculation device (hereinafter referred to as an EGR device), even if the spark-advance angle is controlled by taking the engine rotational speed and the engine load into consideration, a sufficient optimum spark-advance angle cannot be obtained at all.

In order to eliminate this defect occurring in the conventional technique, the applicant previously proposed a method in Japanese patent application No. 51-81,890 for controlling the spark-advance angle in an internal combustion engine provided with an EGR device by using a digital computer. According to this method for controlling the spark-advance angle, the total amount of gas sucked into the engine is obtained by calculation of the measured rotational speed and intake pressure. The ratio of the amount of intake air to the amount of recirculated exhaust gas (hereinafter referred to as EGR gas), namely the EGR ratio, is calculated from the result of such calculation and the amount of actually measured intake air. An optimum spark-advance angle is determined by using the so calculated EGR ratio, and the ignition timing is controlled based on the so determined optimum spark-advance angle.

However, by using the above-mentioned method, the risk of a serious error occurring in the EGR ratio is high especially at low engine rotational speed since discrepancies and errors readily occur between the calculated amount and the actual amount of the total gas. Such error in the EGR ratio can cause a serious error in the spark-advance angle controlled in proportion to the EGR ratio. In such case, if the determined optimum timing angle is too large or too small, serious problems will be caused in the operation of the engine.

SUMMARY OF THE INVENTION

It is therefore a primary object of the present invention to provide a method for controlling the ignition timing in an internal combustion engine provided with an EGR device, whereby the ignition timing can be controlled precisely with much certainty and with no substantial error.

According to the present invention, a method for controlling ignition timing in an internal combustion engine comprises steps for measuring the amount Q of air sucked into the engine and the value $P_B$ of the absolute pressure in an intake manifold of the engine when engine exhaust gas is being recirculated; for calculating the value $P_{BO}$ of absolute pressure in the intake manifold when exhaust gas is not being recirculated, which calculating step being performed by using the measured intake air amount Q and the measured rotational speed N of the engine; for calculating an optimum spark-advance angle $\alpha_O$ in the engine when engine exhaust gas is not being recirculated, which calculating step being performed by using the measured intake air amount Q and the measured rotational speed N of the engine; for calculating an exhaust gas recirculation ratio X using the measured absolute pressure value $P_B$ in the intake manifold and the calculated absolute pressure value $P_{BO}$ in the intake manifold; for calculating an optimum spark-advance angle $\alpha$ in the engine when engine exhaust gas is being recirculated, the above-mentioned calculating step being performed by using the calculated optimum spark-advance angle $\alpha_O$ in the engine and by using the calculated exhaust gas recirculation ratio X of the engine; and the step for controlling ignition timing of an ignition system of the engine in response to the calculated optimum spark-advance angle $\alpha$.

In the preferred embodiment of the present invention, the aforementioned steps for calculating an absolute pressure value $P_{BO}$ and for calculating an optimum spark-advance angle $\alpha_O$ respectively include the step for calculating an absolute pressure value $P_{BO}$ by means of a digital computer programmed to calculate the value $P_{BO}$ from functions describing a desired relationship between the amount of air taken into the engine, the rotational speed of the engine and the value of absolute pressure in the intake manifold when engine exhaust gas is not being recirculated; and the step for calculating an optimum spark-advance angle $\alpha_O$ by means of the digital computer which is also programmed to calculate the angle $\alpha_O$ from functions describing a desired relationship between the amount of air taken into the engine, the rotational speed of the engine, and the optimum spark-advance angle of the engine when engine exhaust gas is not being recirculated.

In a further preferred embodiment of the present invention, the above-mentioned step for calculating an exhaust gas recirculation ratio X includes the step for calculating an exhaust gas recirculation ratio X by means of the digital computer which is programmed to calculate the ratio X from a specific algebraic function. It is preferable that this specific algebraic function be defined as $X=(P_B-P_{BO})/P_B$.

In another further embodiment of the present invention, the above-mentioned step for calculating an optimum spark-advance angle $\alpha$ includes the step for calculating an optimum spark-advance angle $\alpha$ by using the digital computer which is programmed to calculate the angle $\alpha$ from a specific algebraic function. It is preferable that this specific algebraic function be defined as $\alpha=\alpha_O+KX$, where K is a constant.

The above and other related objects and features of the present invention will be apparent from the descrip-

DETAILED DESCRIPTION OF THE INVENTION

Figure 1:
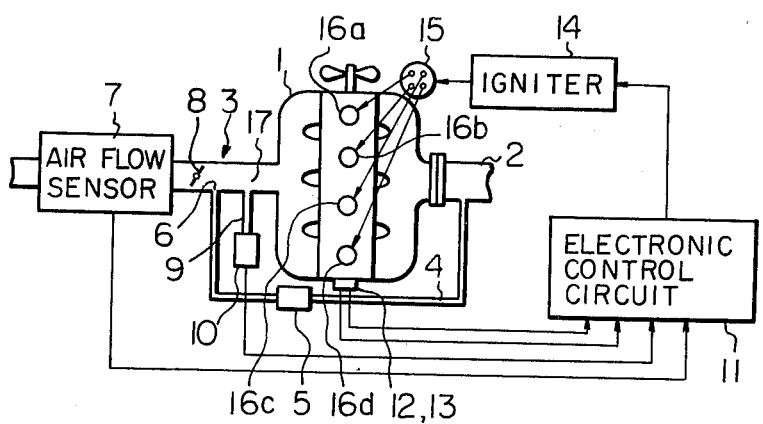
FIG. 1 is a schematic view of an internal combustion engine to which one embodiment of the present invention is applied.

Referring to FIG. 1 which schematically illustrates an internal combustion engine to which one embodiment of the present invention is applied, an EGR pipe 4 is disposed between an exhaust pipe 2 and an intake pipe 3 of an internal combustion engine 1. A part of the exhaust gas in the exhaust pipe 2 is recycled to the intake pipe 3 through the EGR pipe 4. The amount of the recycled exhaust gas is controlled by changing the sectional area of the path of an EGR valve 5 disposed midway of the pipe 4.

An air flow sensor 7 is disposed upstream of a throttle valve 8 in the intake pipe 3, which is disposed upstream of an EGR gas outlet port 6, and a negative pressure detecting port 9 is disposed downstream of the outlet port 6 in the intake pipe 3. A negative pressure sensor 10 is connected to this negative pressure detecting port 9. The air flow sensor 7 sends out an analog voltage level which is proportional to the intake air amount Q of the engine. This output voltage is then applied to an electronic control circuit 11. The negative pressure sensor 10 consists of a member which sends out an analog voltage of a level which is proportional to the absolute pressure value $P_B$ in an intake manifold 17, namely downstream of the throttle valve 8 in the intake pipe 3, for example, a pressure-responsive semi-conductor element. This output voltage is applied to the electronic control circuit 11.

Crank angle position sensors 12 and 13 are attached to a crankshaft (not shown) of the engine 1. Each of the sensors 12 and 13 comprises a disc rotating together with the crankshaft and a magnetic pick-up transducer or the like disposed in the vicinity of the periphery of the disc. Projections are formed on the peripheral end of the disc of the sensor 12 at intervals of a certain crank angle such as 1°. Accordingly, a pulse is generated from the magnetic pick-up transducer of the sensor 12 every time the crankshaft rotates by a certain crank angle such as 1°. Separately, projections are formed on the peripheral end of the disc of the sensor 13 at intervals of 180° so that the top dead center (TDC) of the engine appears every time the projection passes the vicinity of the magnetic pick-up transducer. Output pulses of the crank angle position sensors 12 and 13 are applied to the electronic control circuit 11.

The output terminal of the electronic control circuit 11 is connected to respective spark plugs 16a to 16d through an igniter 14, and a distributor 15.

Figure 2:
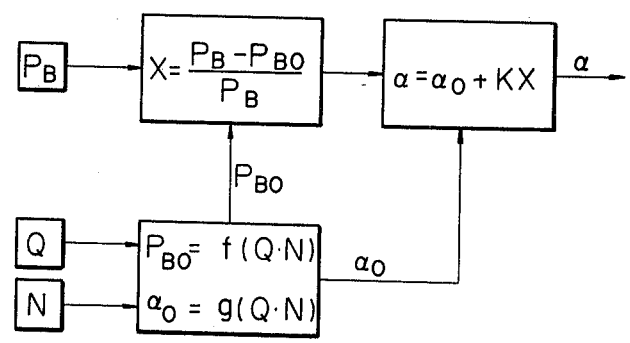
FIG. 2 is a diagram illustrating control procedures of the present invention.

FIG. 2 is a diagram illustrating procedures for calculating the spark-advance angle in the ignition timing control method of the present invention. As shown in FIG. 2, the actual intake air amount Q and the rotational speed N of the engine occurring when exhaust gas is being recirculated are first detected, and then the intake manifold absolute pressure value $P_{BO}$ and the optimum spark-advance angle $\alpha_O$ occurring when exhaust gas is not being recirculated are determined from the predetermined functions of $P_{BO}=f(Q, N)$ and $\alpha_O=g(Q, N)$. Then, the actual intake manifold absolute pressure value $P_B$ of the engine occurring when the exhaust gas is being recirculated is detected, and the EGR ratio X is thereby calculated from the formula $X=(P_B=P_{BO})/P_B$. Finally, the optimum spark-advance angle $\alpha$ occurring when exhaust gas is being recirculated is calculated from the formula $\alpha=\alpha_O+KX$. In the above formula, K stands for constant value which is determined by the engine operating condition and ambient condition such as air-fuel ratio, coolant temperature and barometric pressure.

Figure 3:
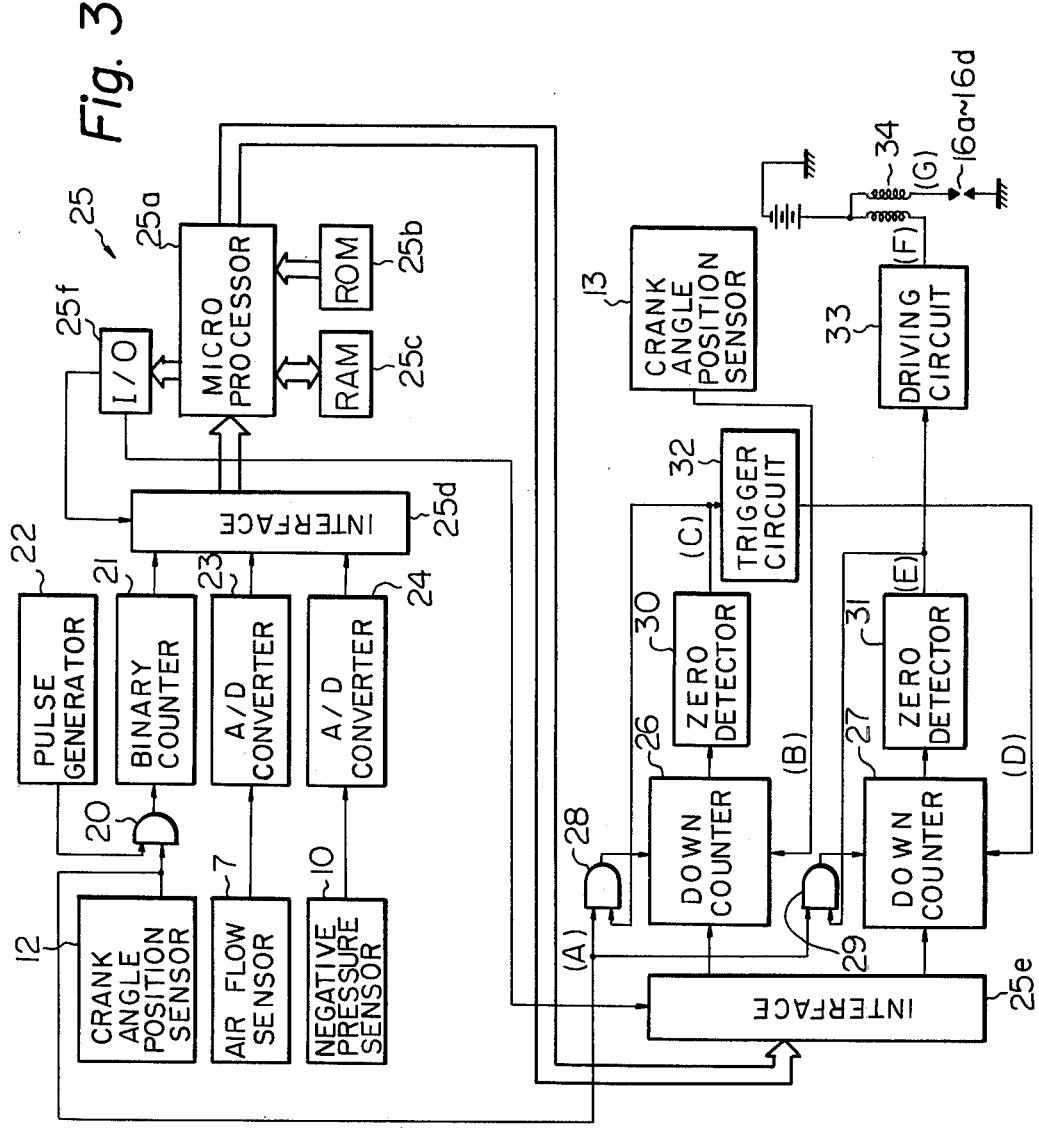
FIG. 3 is a block diagram of a control circuit shown in FIG. 1.

FIG. 3 is a block diagram illustrating in detail the electronic control circuit 11 in the embodiment shown in FIG. 1. The structure and operation of the apparatus of the present embodiment will now be described with reference to this block diagram and to the wave-form diagram of FIG. 4.

The output terminal of the crank angle position sensor 12 is connected to the clock pulse input terminal of a binary counter 21 through an AND gate 20. The output terminal of a pulse generator 22 for generating pulses having a predetermined duration is connected to the other end of the AND gate 20. Accordingly, pulses generated, for example, at every 1° crank angle from the crank angle position sensor 12 are allowed to pass through the AND gate 20 for a predetermined time, and then such pulses are counted by the binary counter 21. Namely, the output of the binary counter 21 is a value proportional to the rotational speed N of the engine.

The analog signal of a level which is proportional to the intake air amount Q of the engine, which signal is sent from the air flow sensor 7, is digitized by an A/D converter 23 which is disposed after the air flow sensor 7.

The analog signal of a level which is proportional to the intake manifold absolute pressure value $P_B$ of the engine, which signal is transmitted from the negative pressure sensor 10 (also called a vacuum level sensor), is digitized by an A/D converter 24 disposed after the negative pressure sensor 24.

The output terminals of the binary counter 21 and the A/D converters 23 and 24 are connected to an interface 25d of a digital computer 25. This digital computer 25 consists of, for example, a commercially available Micro-Computer MCS-8 including a micro-processor 25a such as Intel 8080 or 8008, a read-only memory (ROM) 25b, a random access memory (RAM) 25c, interfaces 25d and 25e and an input-output (I/O) device 25f for controlling the interfaces 25d and 25e. The storage and processing capacity of such Micro-Computer MCS-8 are much greater than the capacities required in the present invention. Accordingly, for carrying out the present invention, a custom-made digital computer may be used so as to reduce the cost and space required.

An optimum value of the spark-advance angle $\alpha_O$ occurring when the exhaust gas is not recirculated, which value expressed as a function of the intake air amount Q and the rotational speed N of the engine, is stored in ROM 25b of the digital computer 25. The relation of $\alpha_O=g(Q, N)$ can readily be determined in advance by experiments. The relation of $P_{BO}=f(Q, N)$ among the intake air amount Q, rotational speed N and intake pipe absolute pressure value $P_{BO}$ of the engine occurring when EGR is not being effected is stored in ROM 25b. This function $P_{BO}=f(Q, N)$ is also determined in advance by experiments. The determined function can be expressed, for example, as $P_{BO}=a(Q/N)+b$, where a and b are constants.

The digital computer 25 first reads various input data, namely the intake air amount Q, rotational speed N and intake manifold absolute pressure value $P_B$, through the interface 25d, and they are stored at predetermined address positions of RAM 25c. By using the above-mentioned input data Q and N, the intake manifold absolute pressure value $P_{BO}$ occurring when the exhaust gas is not being recirculated is calculated from the function f(Q, N) stored in ROM 25b, and the EGR ratio X is determined from the calculated value of the intake manifold absolute pressure value $P_{BO}$ and the input data $P_B$ according to the formula $X=(P_B=P_{BO})/P_B$. Then, an optimum spark-advance angle $\alpha_O$ occurring when the exhaust gas is not being recirculated is determined by using the input data Q and N from the function g(Q, N) stored in ROM 25b, and from this $\alpha_O$ and the above EGR ratio X, an optimum spark-advance angle $\alpha$, when the exhaust gas is being recirculated is calculated according to the formula, $\alpha=\alpha_O+KX$. As pointed out hereinbefore, K is a constant which is usually assigned a value residing within the range of from about 0.5 to about 1.0. It is known in the art that when the exhaust gas is recirculated, an optimum spark-advance angle can be obtained by increasing the spark-advance angle in proportion to the EGR ratio, namely, in proportion to the amount of the inert gas in the cylinder. For example, it is known that when the EGR ratio is increased by 1%, good results can be obtained if the spark-advance angle is made larger than the optimum spark-advance angle occurring when the exhaust gas is not being recirculated by about 1°.

After calculation of the spark-advance angle $\alpha$ is finished, the micro-computer 25 calculates the output data concerning the ingition timing and the timing for initiating application of electricity to the ignition coil. In the present embodiment, since the engine is of the four-cylinder four-stroke cycle type, the standard ignition point thereof, namely, the top dead center, appears at every crank angle of 180°, and each of the clock pulses from down-counters 26 and 27 described hereinafter has a frequency corresponding to a crank angle of 1°. Accordingly, the ignition timing data can be expressed as $(180°-\alpha_O)/1°$. Supposing that the predetermined dwell angle is $\beta$, the timing for initiating application of electricity to the ignition coil occurs later by a crank angle of $(180°-\beta)$ than the ignition timing in the preceding cylinder. Accordingly, the timing data for initiating application of electricity to the ignition coil can be expressed as $(180°-\beta)/1°$.

Data input terminals of the down-counters 26 and 27 which can be preset are connected to the digital computer 25 through the interface 25e, and clock pulse input terminals thereof are connected to the output terminal of the above-mentioned crank angle position sensor 12 through AND gates 28 and 29, respectively. The load signal input terminal of the down-counter 26 is connected to the output terminal of the above-mentioned crank angle position sensor 13. The output terminals of the down-counters 26 and 27 are connected to input terminals of zero detectors 30 and 31, respectively. The output terminals of the zero detectors 30 and 31 are connected to the other input terminals of the AND gates 28 and 29, respectively. The zero detectors 30 and 31 are arranged so that each of the detector generates a low level output when the output value of the respective down-counters 26 and 27 is zero, and each of the detectors generates a high level output when the output value of the respective down-counters 26 and 27 is a value other than zero.

Figure 4:
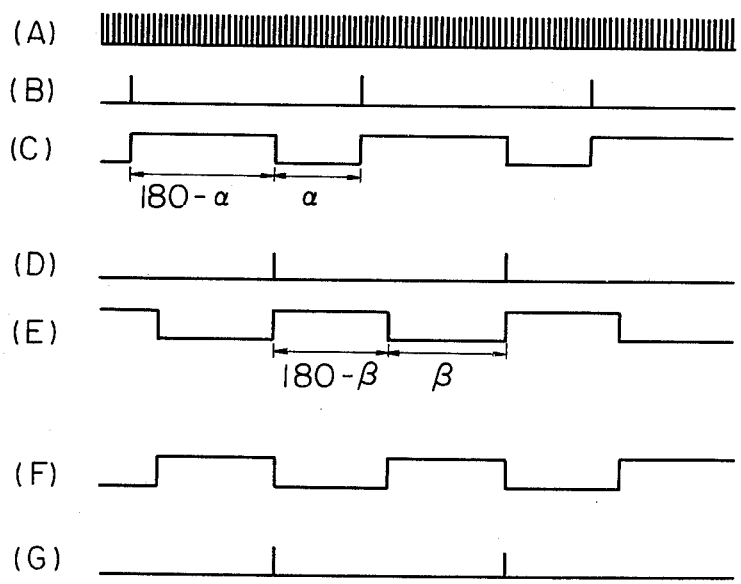
FIG. 4 is a diagram illustrating wave-forms obtained at various points in the control circuit shown in detail in FIG. 3.

When a signal indicating the top dead center (TDC) in the engine [FIG. 4-(B)] is applied to the down-counter 26 from the crank angle position sensor 13, the down-counter 26 receives the above-mentioned ignition timing data from the digital computer 25 as a presetting value thereof. At this point, because the output [FIG. 4-(C)] of the zero detector 30 is a high level output the AND gate 28 can thereby be opened. Then, the clock pulse [FIG. 4-(A)] is applied to the down-counter 26, and the counting operation is performed. When the output value of the down-counter 26 is reduced to zero, the output of the zero detector 30 is changed to a low level output and a negative leading edge trigger circuit 32, which is connected to the output terminal of the zero detector 30 and which is comprised of, for example, a differentiation circuit, is therefore energized. When the output pulse [FIG. 4-(D)] of the trigger circuit 32 is applied to the down-counter 27, it receives the above-mentioned data of the current application starting point from the digital computer 25 as a presetting value thereof. At this point, because the output [FIG. 4-(E)] of the zero detector 31 is a high level output, the AND gate 29 is opened, the clock pulse [FIG. 4-(A)] is applied to the down-counter 27, and counting is performed. When the output value of the down-counter 27 is reduced to zero, the output of the zero detector 31 is changed to a low level output.

The output terminal of the zero detector 31 is connected to a circuit 33 for driving the ignition coil 34, and this driving circuit 33 supplies an ignition current [FIG. 4-(F)] corresponding to an inverting form of the voltage [FIG. 4-(E)] applied thereto, to a primary winding of the ignition coil 34, whereby in each of spark plugs 16a through 16d, sparks [FIG. 4-(G)] are generated at every falling point in the above-mentioned ignition current [FIG. 4-(F)].

As will be apparent from the foregoing description, according to the present invention, even in an internal combustion engine provided with an EGR apparatus, since at every operation point of the engine the spark-advance angle is determined by calculating the EGR ratio, the timing control can be performed in a manner most preferred for reducing the contents of harmful components in the exhaust gas and for lowering the fuel consumption ratio. Especially, since the sum of the amount of intake air introduced into the engine and the amount of EGR gas is represented by the actually measured intake manifold absolute pressure value and the intake manifold absolute pressure value $P_{BO}$ occurring when the exhaust gas is not being recirculated, which value $P_{BO}$ can be precisely obtained for the entire operational region of the engine by means of calculation using a particular function, the EGR ratio can be determined very precisely and assuredly with no substantial error, therefore, the ignition timing can be very precisely controlled to an optimum level.

As many widely different embodiments of the present invention may be constructed without departing from the spirit and scope of the present invention, it should be understood that the present invention is not limited to the specific embodiments described in this application, except as defined in the appended claims.

What is claimed is:

1. A method for controlling ignition timing in an internal combustion engine having an exhaust gas recirculation device, an intake manifold, and an ignition system, said method comprising the steps of measuring the amount Q of air taken into said engine, the rotational speed N of said engine and the value $P_B$ of absolute pressure in said intake manifold of said engine when exhaust gas is being recirculated;

calculating the value $P_{BO}$ of absolute pressure in said intake manifold when exhaust gas is not being recirculated, said calculation being performed by using said measured amount Q of air taken into said engine and by using said measured rotational speed N of said engine;

calculating an optimum spark-advance angle $\alpha_O$ in said engine when exhaust gas is not being recirculated, said calculation being performed by using said measured amount Q of air taken into said engine and by using said measured rotational speed N of the said engine;

calculating an exhaust gas recirculation ratio X using said measured value $P_B$ for absolute pressure in said intake manifold and said calculated value $P_{BO}$ for absolute pressure in said intake manifold;

calculating an optimum spark-advance angle $\alpha$ in said engine when exhaust gas is being recirculated, said calculation being performed by using said calculated optimum spark-advance angle $\alpha_O$ in said engine and by using said calculated exhaust gas recirculation ratio X; then controlling ignition timing of said ignition system in response to said calculated optimum spark-advance angle $\alpha$.

2. A method for controlling ignition timing in an internal combustion engine as claimed in claim 1, wherein said engine has a digital computer, wherein said step, of calculating an absolute pressure value $P_{BO}$ and of calculating an optimum spark-advance angle $\alpha_O$ respectively include the step of calculating an absolute pressure value $P_{BO}$ by means of said digital computer programmed to calculate said value $P_{BO}$ from functions describing a desired relationship between the amount of air taken into said engine, the rotational speed of said engine, and the value of absolute pressure in said intake manifold of said engine when exhaust gas is not being recirculated; and the step of calculating an optimum spark-advance angle $\alpha_O$ by said digital computer programmed to calculate said optimum spark-advance angle $\alpha_O$ from functions describing a desired relationship between the amount of air taken into said engine, the rotational speed of said engine, and the optimum spark-advance angle of said engine when exhaust gas is not being recirculated.

3. A method for controlling ignition timing in an internal combustion engine as claimed in claim 1, wherein said engine has a digital computer, wherein said step of calculating an exhaust gas recirculation ratio X includes a step of calculating an exhaust gas recirculation ratio X by said digital computer programmed to calculate said ratio X from a specific algebraic function.

4. A method for controlling ignition timing in an internal combustion engine as claimed in claim 3, wherein said specific algebraic function is defined as $X=(P_B-P_{BO})/P_B$.

5. A method for controlling ignition timing in an internal combustion engine as claimed in claim 1, wherein said engine has a digital computer, said step of calculating an optimum spark-advance angle $\alpha$ includes a step of calculating an optimum spark-advance angle $\alpha$ by said digital computer programmed to calculate said angle $\alpha$ from a specific algebraic function.

6. A method for controlling ignition timing in an internal combustion engine as claimed in claim 5, wherein said specific algebraic function is defined as $\alpha=\alpha_O+KX$, where K is a constant.

* * * * *